US010621899B2

(12) United States Patent
Kim et al.

(10) Patent No.: US 10,621,899 B2
(45) Date of Patent: Apr. 14, 2020

(54) DISPLAY APPARATUS AND METHOD OF CONTROLLING THEREOF

(71) Applicant: SAMSUNG ELECTRONICS CO., LTD., Suwon-si, Gyeonggi-do (KR)

(72) Inventors: Ju Yong Kim, Suwon-si (KR); Jin Sung An, Suwon-si (KR); Sung Ju Lee, Hwaseong-si (KR); Seung Sin Lee, Yongin-si (KR); Hye Young Jung, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 48 days.

(21) Appl. No.: 15/695,178

(22) Filed: Sep. 5, 2017

(65) Prior Publication Data

US 2018/0102080 A1 Apr. 12, 2018

(30) Foreign Application Priority Data

Oct. 12, 2016 (KR) .................... 10-2016-0131975

(51) Int. Cl.
| | |
|---|---|
| *G09G 3/20* | (2006.01) |
| *G09G 5/10* | (2006.01) |
| *G06K 9/46* | (2006.01) |
| *G09G 5/00* | (2006.01) |

(52) U.S. Cl.
CPC ......... *G09G 3/2003* (2013.01); *G06K 9/4642* (2013.01); *G06K 9/4652* (2013.01); *G09G 5/10* (2013.01); *G09G 5/003* (2013.01); *G09G 2320/0271* (2013.01); *G09G 2320/0666* (2013.01); *G09G 2320/0673* (2013.01); *G09G 2320/08* (2013.01); *G09G 2354/00* (2013.01); *G09G 2360/16* (2013.01)

(58) Field of Classification Search
CPC ................... G09G 3/2003; G09G 5/10; G09G 2320/0271; G09G 2354/00; G09G 2320/08; G09G 5/003; G09G 2360/16; G09G 2320/0673; G09G 2320/0666; G06K 9/4642; G06K 9/4652
See application file for complete search history.

(56) References Cited

U.S. PATENT DOCUMENTS

| | | | | | |
|---|---|---|---|---|---|
| 5,742,263 | A | * | 4/1998 | Wang | ................... G02B 27/017 345/7 |
| 5,796,874 | A | * | 8/1998 | Woolfe | ................... G06T 5/007 358/509 |
| 6,163,621 | A | * | 12/2000 | Paik | ................... G06K 9/00442 382/169 |

(Continued)

FOREIGN PATENT DOCUMENTS

| | | |
|---|---|---|
| KR | 89-3496 | 4/1989 |
| KR | 89-20259 | 10/1989 |

(Continued)

*Primary Examiner* — Jose R Soto Lopez
(74) *Attorney, Agent, or Firm* — Nixon & Vanderhye P.C.

(57) ABSTRACT

Disclosed herein are a display apparatus which includes an image processor configured to analyze a histogram of image data including at least one of a white color level and a black color level to determine a color level range and a controller configured to set a display mode or to convert the color level range based on the determined color level range.

17 Claims, 15 Drawing Sheets

(56) References Cited

U.S. PATENT DOCUMENTS

| | | | | |
|---|---|---|---|---|
| 6,272,248 B1* | 8/2001 | Saitoh | G06K 9/46 | 382/218 |
| 6,460,045 B1* | 10/2002 | Aboulnaga | G06F 16/2462 | |
| 6,462,835 B1* | 10/2002 | Loushin | G06T 5/009 | 358/1.9 |
| 6,631,209 B1* | 10/2003 | Kanamori | H04N 1/4074 | 358/461 |
| 6,714,677 B1* | 3/2004 | Stearns | G06K 7/14 | 235/494 |
| 6,941,013 B1* | 9/2005 | Drayer | G06K 9/38 | 345/610 |
| 8,670,169 B2 | 3/2014 | Kunieda | H04N 1/6027 | 358/1.9 |
| 9,165,210 B1* | 10/2015 | Srinivasan | G06T 5/008 | |
| 9,530,362 B2* | 12/2016 | Chen | G09G 3/2003 | |
| 10,062,152 B2* | 8/2018 | Choudhury | G06K 9/4647 | |
| 2001/0053248 A1* | 12/2001 | Maeda | G06K 9/38 | 382/165 |
| 2003/0151674 A1* | 8/2003 | Lin | G06K 9/036 | 348/222.1 |
| 2003/0202714 A1* | 10/2003 | Yang | G06T 5/009 | 382/274 |
| 2003/0231194 A1* | 12/2003 | Morgan | G09G 3/2022 | 345/691 |
| 2005/0129284 A1* | 6/2005 | Campbell | G09B 21/001 | 382/114 |
| 2005/0195298 A1* | 9/2005 | Byun | G06T 5/008 | 348/254 |
| 2005/0196064 A1* | 9/2005 | Sugimoto | G06T 5/004 | 382/266 |
| 2006/0050084 A1* | 3/2006 | Jeffrey | G06T 5/009 | 345/617 |
| 2006/0093207 A1* | 5/2006 | Reicher | G06F 3/167 | 382/156 |
| 2006/0146196 A1* | 7/2006 | Suenaga | G06T 11/001 | 348/624 |
| 2007/0070463 A1* | 3/2007 | Moro | H04N 1/46 | 358/515 |
| 2007/0092139 A1* | 4/2007 | Daly | G09G 3/3406 | 382/169 |
| 2007/0242079 A1* | 10/2007 | Hayaishi | G06T 11/001 | 345/604 |
| 2007/0268242 A1* | 11/2007 | Baba | G09G 3/3406 | 345/102 |
| 2007/0285574 A1* | 12/2007 | Nobori | H04N 5/147 | 348/581 |
| 2008/0001974 A1* | 1/2008 | Kim | G09G 3/3233 | 345/690 |
| 2008/0037897 A1* | 2/2008 | Chiang | G06T 5/009 | 382/273 |
| 2008/0123952 A1* | 5/2008 | Parkkinen | G06T 5/009 | 382/168 |
| 2008/0129505 A1* | 6/2008 | Lin | G06K 7/0008 | 340/572.1 |
| 2008/0246779 A1* | 10/2008 | Lee, II | G06T 5/009 | 345/690 |
| 2008/0267529 A1* | 10/2008 | Bradburn | H04N 1/413 | 382/282 |
| 2008/0272999 A1* | 11/2008 | Kurokawa | G09G 3/3406 | 345/89 |
| 2009/0009665 A1* | 1/2009 | Tsutsumi | H04N 5/202 | 348/674 |
| 2009/0136130 A1* | 5/2009 | Piper | G06F 16/00 | 382/170 |
| 2009/0303341 A1* | 12/2009 | Mikawa | H04N 1/6027 | 348/222.1 |
| 2010/0026825 A1* | 2/2010 | Doida | G06T 3/40 | 348/222.1 |
| 2010/0033414 A1* | 2/2010 | Jeong | G09G 3/3655 | 345/89 |
| 2010/0091348 A1* | 4/2010 | Iwamoto | G06T 5/009 | 358/518 |
| 2010/0134477 A1* | 6/2010 | Kim | G09G 3/3406 | 345/214 |
| 2010/0245874 A1* | 9/2010 | Holub | G01J 3/50 | 358/1.9 |
| 2010/0246947 A1* | 9/2010 | Ma | G06K 9/38 | 382/167 |
| 2010/0254623 A1* | 10/2010 | Yu | G06T 5/009 | 382/274 |
| 2011/0001737 A1* | 1/2011 | Kerofsky | G09G 3/3406 | 345/207 |
| 2011/0115980 A1* | 5/2011 | Shmueli | H04N 5/57 | 348/607 |
| 2011/0129149 A1* | 6/2011 | Kang | G06K 9/00281 | 382/168 |
| 2011/0150280 A1* | 6/2011 | Tsuji | G06T 7/248 | 382/103 |
| 2012/0139933 A1* | 6/2012 | Mihara | G06T 11/001 | 345/589 |
| 2012/0148090 A1* | 6/2012 | Omi | G06T 5/009 | 382/100 |
| 2012/0183182 A1* | 7/2012 | Kumar | G06K 9/00442 | 382/119 |
| 2012/0263379 A1* | 10/2012 | Bhatti | G06T 11/001 | 382/167 |
| 2012/0288197 A1* | 11/2012 | Adachi | G06T 7/001 | 382/167 |
| 2013/0057729 A1* | 3/2013 | Ajito | H04N 5/23293 | 348/234 |
| 2013/0097099 A1* | 4/2013 | Clark | G06Q 30/04 | 705/400 |
| 2013/0114000 A1* | 5/2013 | Atkins | H04N 5/20 | 348/708 |
| 2013/0142426 A1* | 6/2013 | Kaneda | G06K 9/4642 | 382/165 |
| 2013/0239057 A1* | 9/2013 | Ubillos | G06F 3/04855 | 715/833 |
| 2013/0272606 A1* | 10/2013 | Nakamura | G06K 9/4652 | 382/167 |
| 2013/0321873 A1* | 12/2013 | Ido | G06K 15/1878 | 358/3.27 |
| 2013/0329056 A1* | 12/2013 | Stauder | H04N 1/6033 | 348/175 |
| 2013/0332866 A1* | 12/2013 | Johnson | H04N 5/232 | 715/764 |
| 2014/0078193 A1* | 3/2014 | Barnhoefer | G09G 3/3406 | 345/690 |
| 2014/0285477 A1* | 9/2014 | Cho | G09G 5/02 | 345/207 |
| 2015/0002552 A1* | 1/2015 | Takagi | G09G 3/2003 | 345/690 |
| 2015/0228224 A1* | 8/2015 | Park | G09G 3/3233 | 345/691 |
| 2015/0332444 A1* | 11/2015 | Tsuda | G06T 7/90 | 382/167 |
| 2016/0004943 A1* | 1/2016 | Asai | G06K 15/408 | 358/1.15 |
| 2016/0092779 A1* | 3/2016 | Werth | G06N 3/0445 | 706/48 |
| 2016/0093239 A1* | 3/2016 | Wang | G06F 1/32 | 345/55 |
| 2016/0189636 A1* | 6/2016 | Liu | G09G 3/3406 | 345/690 |
| 2016/0291015 A1* | 10/2016 | Huet | G01N 15/00 | |
| 2017/0018105 A1* | 1/2017 | Hasegawa | G06F 3/04845 | |
| 2017/0061848 A1* | 3/2017 | Nakagoshi | G06T 7/90 | |
| 2017/0091557 A1* | 3/2017 | Wong | G06K 9/00744 | |
| 2017/0280069 A1* | 9/2017 | Smith | G06T 7/277 | |
| 2017/0293205 A1* | 10/2017 | Iwata | H04N 1/00458 | |
| 2017/0358066 A1* | 12/2017 | Nazemi | G06T 5/40 | |
| 2018/0035088 A1* | 2/2018 | Nose | H04N 5/23229 | |
| 2018/0129914 A1* | 5/2018 | Kariya | G06K 9/6212 | |
| 2018/0205867 A1* | 7/2018 | Agata | H04N 5/23229 | |
| 2018/0225522 A1* | 8/2018 | Herrero Molina | G06K 9/3241 | |
| 2018/0336669 A1* | 11/2018 | Mertens | G06T 5/007 | |
| 2019/0035065 A1* | 1/2019 | Yazawa | H04N 1/4074 | |

(56) References Cited

U.S. PATENT DOCUMENTS

FOREIGN PATENT DOCUMENTS

| | | |
|---|---|---|
| KR | 90-16337 | 9/1990 |
| KR | 1990-0010966 | 12/1990 |
| KR | 91-13565 | 7/1991 |
| KR | 93-7267 | 4/1993 |
| KR | 1993-017047 | 7/1993 |
| KR | 95-2465 | 1/1995 |
| KR | 1995-007557 | 3/1995 |
| KR | 1994-211445 | 12/1998 |
| KR | 1997-0048005 | 5/1999 |
| KR | 2001-0001458 | 1/2001 |
| KR | 20-0418656 | 6/2006 |

\* cited by examiner

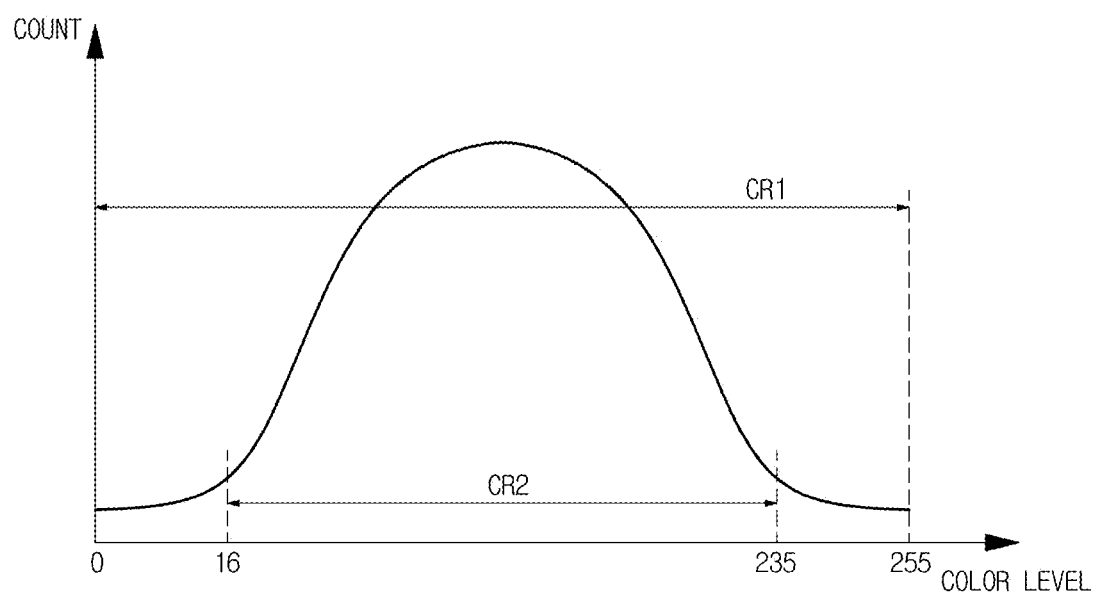

DISPLAY APPARATUS AND METHOD OF CONTROLLING THEREOF

CROSS-REFERENCE TO RELATED APPLICATION

This application is based on and claims priority under 35 U.S.C. § 119 to Korean Patent Application No. 10-2016-0131975, filed on Oct. 12, 2016 in the Korean Intellectual Property Office, the disclosure of which is incorporated by reference herein in its entirety.

BACKGROUND

1. Field

The present disclosure relates generally to a display apparatus for displaying image data, and a method of driving the display apparatus.

2. Description of Related Art

A display apparatus refers to equipment including a device capable of displaying images to visually display various images.

The display apparatus processes image data received from various external image sources or stored in itself, and may display images on the display apparatus. For example, the display apparatus may display an image of a broadcast channel desired by a user on the display apparatus through various image processing processes such as decoding, scaling, and the like of a broadcast signal received from the outside. The display apparatus can appropriately convert and display image data received from an external or internal image supply source. Particularly, in recent years, there are various image supply sources, and research on a method of appropriately converting image data received from various image supply sources is underway.

SUMMARY

According to an example embodiment of the present disclosure a display apparatus may include an image processor configured to analyze a histogram of image data including at least one of a white color level and a black color level to determine a color level range and a controller configured to set a display mode or to convert the color level range based on the determined color level range.

The image processor may determine at least one of a minimum color level and a maximum color level of the image data based on the histogram of the image data, and determine whether a color level range of the image data corresponds to a first color level range having a full color level or a second color level range having a partial color level based on at least one of the determined minimum color level and the maximum color level.

The controller may set the display mode to either a first display mode in which the image data is displayed in a full color level range or a second display mode in which the image data is displayed in a partial color level range to correspond to the determined color level range.

The controller, if the determined color level range is a first color level range having a full color level and the display mode is set to a second display mode for displaying the image data in a partial color level range, may change the display mode to a first display mode for displaying the image data in a full color level range.

The controller, if the determined color level range is a second color level range having a partial color level range and the display mode is set to a second display mode for displaying the image data in a partial color level range, may change the display mode to a first display mode for displaying image data in a full color level range from the second display mode and control the display mode to convert the color level range of the image data into the full color level range, or maintain the set second display mode.

The controller may display a user interface providing a pop-up message requesting input of image data including the at least one of the white color level and the black color level on a display panel.

The controller may display a user interface providing a pop-up message requesting re-input of image data or including an alert notification content on a display panel if the color level range is not determined based on the determined at least one of the minimum color level and the maximum color level.

According to another example embodiment of the present disclosure a display apparatus may include an image processor configured to analyze at least one histogram of image data included in a preset time, image data included in a preset number of scenes, and image data included in a preset capacity to determine a color level range and a controller is configured to set a display mode or to convert the color level range based on the determined color level range.

The image processor may set at least one of the image data included in the preset time, the image data included in the predetermined number of scenes, and the image data included in the preset capacity as the histogram analysis target.

The image processor may determine at least one of a minimum color level and a maximum color level based on the analyzed histogram and determine whether the color range of the image data corresponds to one of a first color level range having a full color level or a second color level range having a partial color level based on at least one of the determined minimum color level and maximum color level.

The controller may set the display mode to a first display mode in which the display mode is displayed in a full color level range or a second display mode in which the display mode is displayed in a partial color level range to correspond to the determined color level range.

The controller, if the determined color level range is a first color level range having a full color level and the display mode is set to a second display mode for displaying the image data in a partial color level range, may change the display mode to a first display mode for displaying the image data in a full color level range from the second display mode.

The controller, if the determined color level range is a second color level range having a partial color level range and the display mode is set to a second display mode for displaying the image data in a partial color level range, may change the display mode to a first display mode for displaying image data in a full color level range from the second display mode and control the display mode to convert the color level range of the image data into the full color level range, or maintain the set second display mode.

The controller may display a user interface providing a pop-up message including an alert notification content on a display panel if the color level range is not determined based on the determined at least one of the minimum color level and the maximum color level.

According to another example embodiment of the present disclosure a method of driving a display apparatus may include analyzing a histogram of the image data to determine a color level range and setting a display mode or controlling conversion of the color level range based on the determined color level range.

The determining of a color level range may include setting at least one of image data input from a user, image data included in a preset time, image data included in a predetermined number of scenes, and image data included in a preset capacity as a histogram analysis target.

The determining of a color level range may include determining at least one of a minimum color level and a maximum color level of the image data based on the histogram of the image data, and determining whether a color level range of the image data corresponds to a first color level range having a full color level or a second color level range having a partial color level based on at least one of the determined minimum color level and the maximum color level.

The controlling of a color level range may include setting the display mode to either a first display mode in which the image data is displayed in a full color level range or a second display mode in which the image data is displayed in a partial color level range to correspond to the determined color level range.

The controlling of a color level range may include changing the display mode to a first display mode for displaying the image data in a full color level range if the determined color level range is a first color level range having a full color level and the display mode is set to a second display mode for displaying the image data in a partial color level range, The controlling of a color level range may include displaying a user interface providing a pop-up message requesting re-input of image data or including an alert notification content on a display panel if the color level range is not determined based on the determined at least one of the minimum color level and the maximum color level.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein:

FIG. 8 is a diagram illustrating an example histogram analysis result according to an example embodiment of the present disclosure;

DETAILED DESCRIPTION

Hereinafter, various example embodiments of the present disclosure will be described in greater detail with reference to the accompanying drawings.

Figure 1:
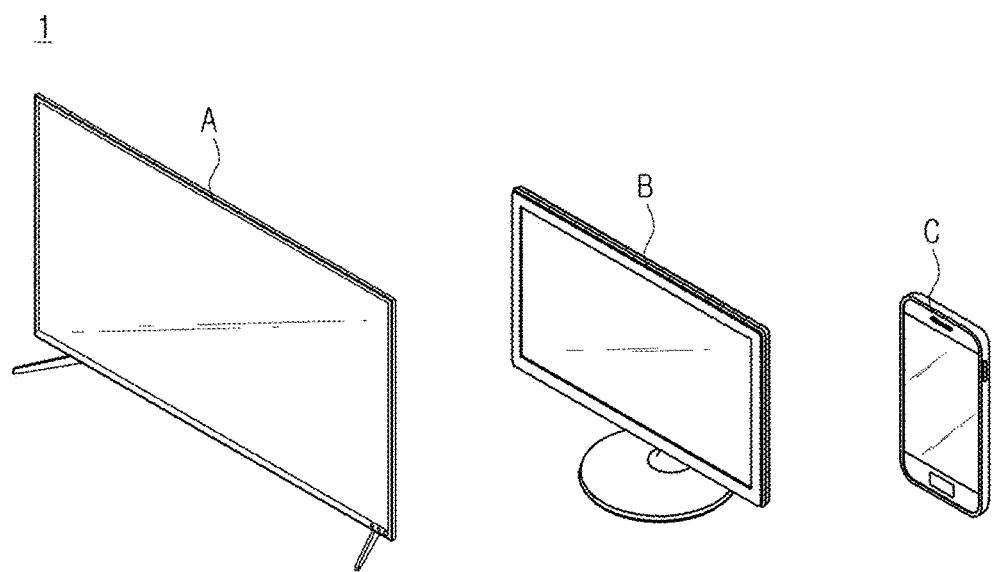
FIG. 1 is a diagram illustrating examples of various kinds of display apparatuses according to an example embodiment of the present disclosure.
Figure 2:
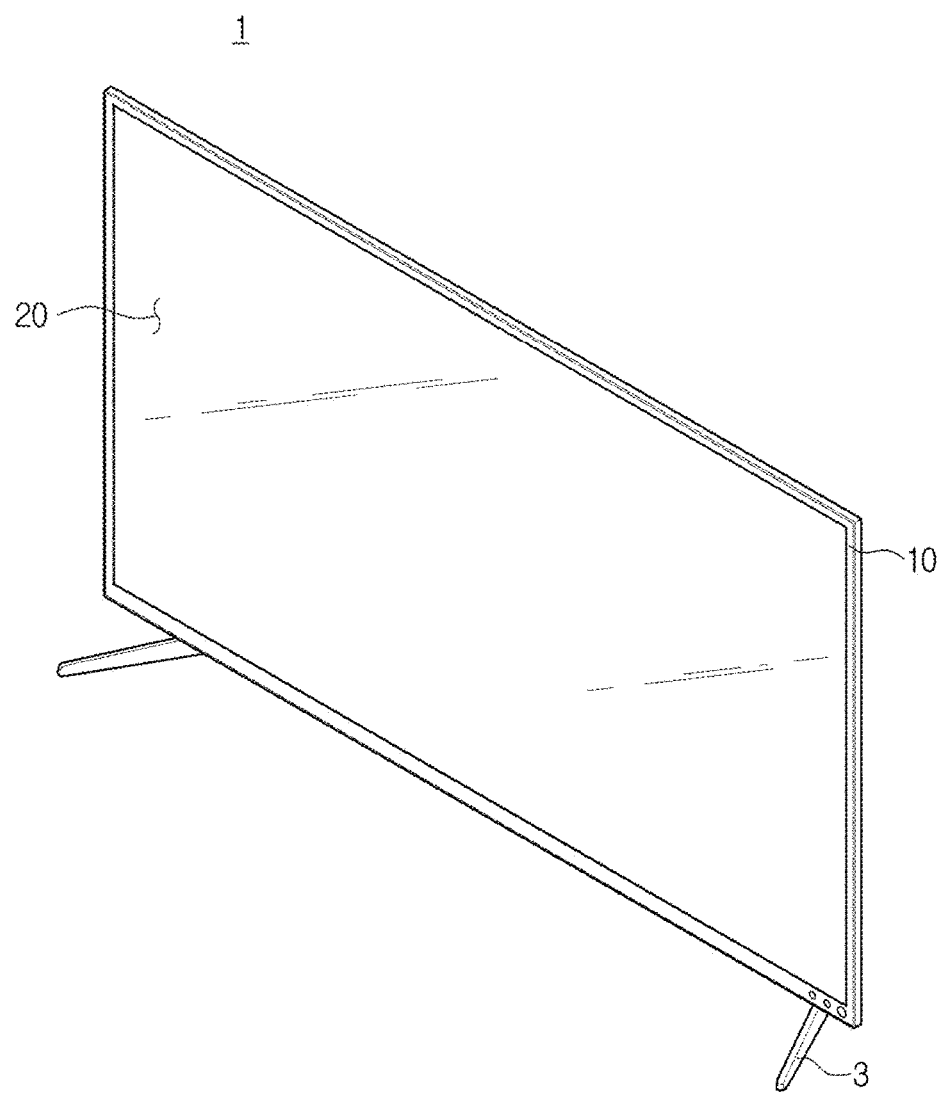
FIG. 2 is a diagram illustrating an example external appearance of a display apparatus according to an example embodiment of the present disclosure.

FIG. 1 is a diagram illustrating examples of various kinds of display apparatuses according to an example embodiment of the present disclosure. FIG. 2 is a diagram illustrating an external appearance of an example display apparatus according to an example embodiment of the present disclosure. The following description will be given with reference to all of FIGS. 1 to 12 to avoid duplication of the description.

A display apparatus 1 refer to equipment including a display panel capable of displaying images to visually display image data of various formats. For example, the display apparatus 1 includes, for example, and without limitation, all kinds of various apparatuses for displaying various image data through the display panel such as a (TV) A, a monitor B, and a smart phone C as illustrated FIG. 1.

The display apparatus 1 may include, for example, and without limitation, all kinds of various types of apparatuses such as a portable multimedia device such as a PDP (Personal Digital Assistant), a PMP (Portable Multimedia Player) and a portable communication device such as a wearable device, for example glasses or watches. In addition, the display apparatus 1 may include all the apparatuses capable of visually displaying image data because the display apparatus 1 has a built-in processor and can perform various image processing processes and has a display panel. There is no limit to the types that can be implemented.

In the following description, a television illustrated in FIG. 2 will be described as an example of the display apparatus 1, however, example embodiments of the present disclosure are not limited to the television. For example, the example embodiments of the present disclosure can be applied to any display apparatus including a display panel to visually provide various kinds of images for a user.

Referring to FIG. 2, the display apparatus 1 may include a main body 10 forming the external appearance of the display apparatus 1 and configured to accommodate various components of the display apparatus 1, and a display panel 20 configured to display images for a user.

Meanwhile, the display apparatus 1 illustrated in FIG. 2 may be implemented as a stand type or a wall-mounted type according to its support type. According to an example embodiment, the main body 10 may be implemented as a wall-mounted type that is mounted on a vertical surface such as a wall through a bracket or the like. According to another embodiment, a stand 3 for supporting the main body 10 may be connected to the lower portion of the main body 10 so that the main body 10 can be disposed stably on a flat surface on the stand.

In the front portion of the main body 10, a button group for receiving various control commands from a user, and the display panel 20 for displaying images according to the user's control command may be provided. Also, in the inside of the main body 10, various components may be installed to perform functions of the display apparatus 1. Hereinafter, a block diagram of the display apparatus 1 will be described in greater detail below.

Figure 3:
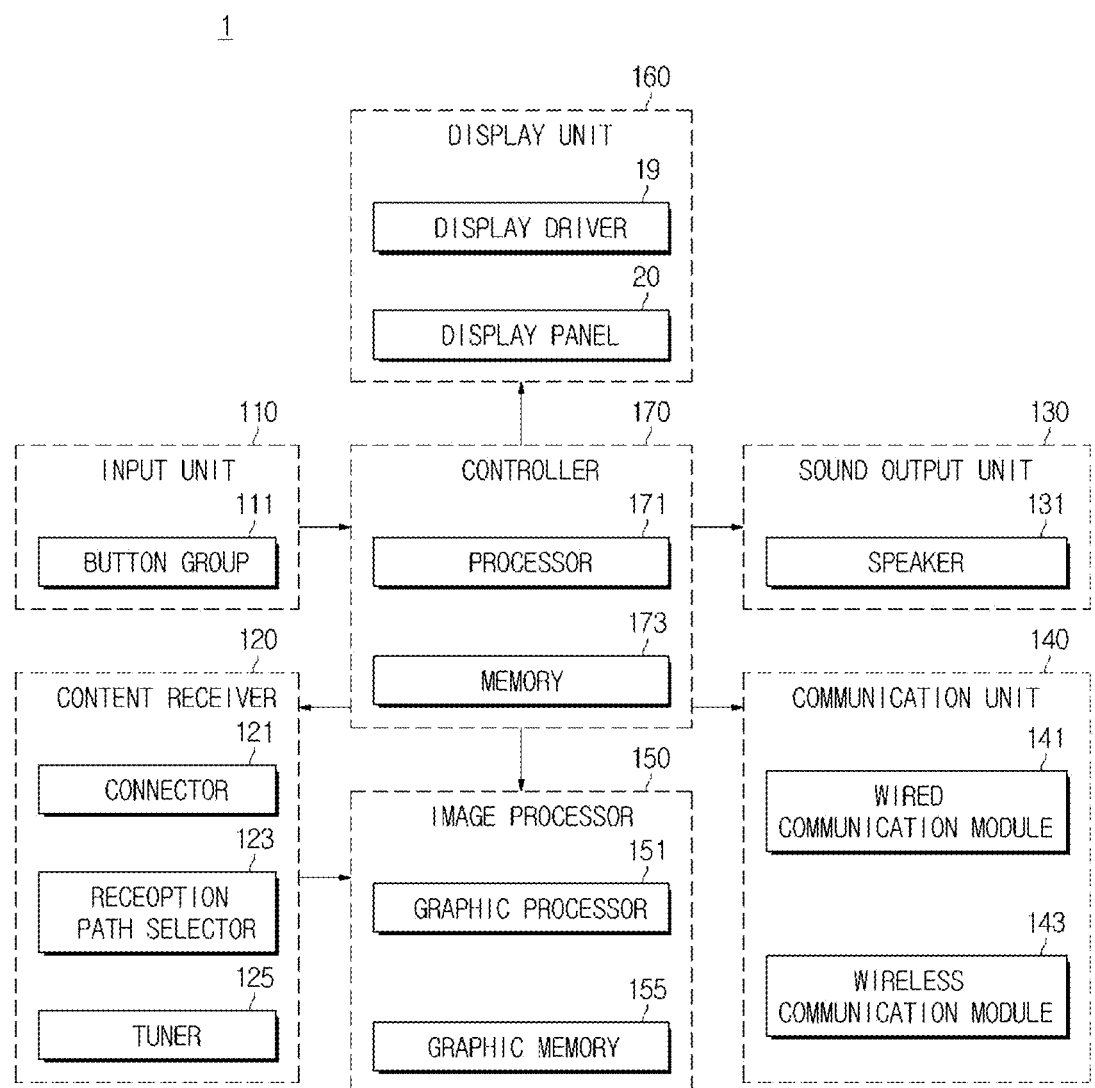
FIG. 3 is a block diagram illustrating an example display apparatus according to an example embodiment of the present disclosure.
Figure 4:
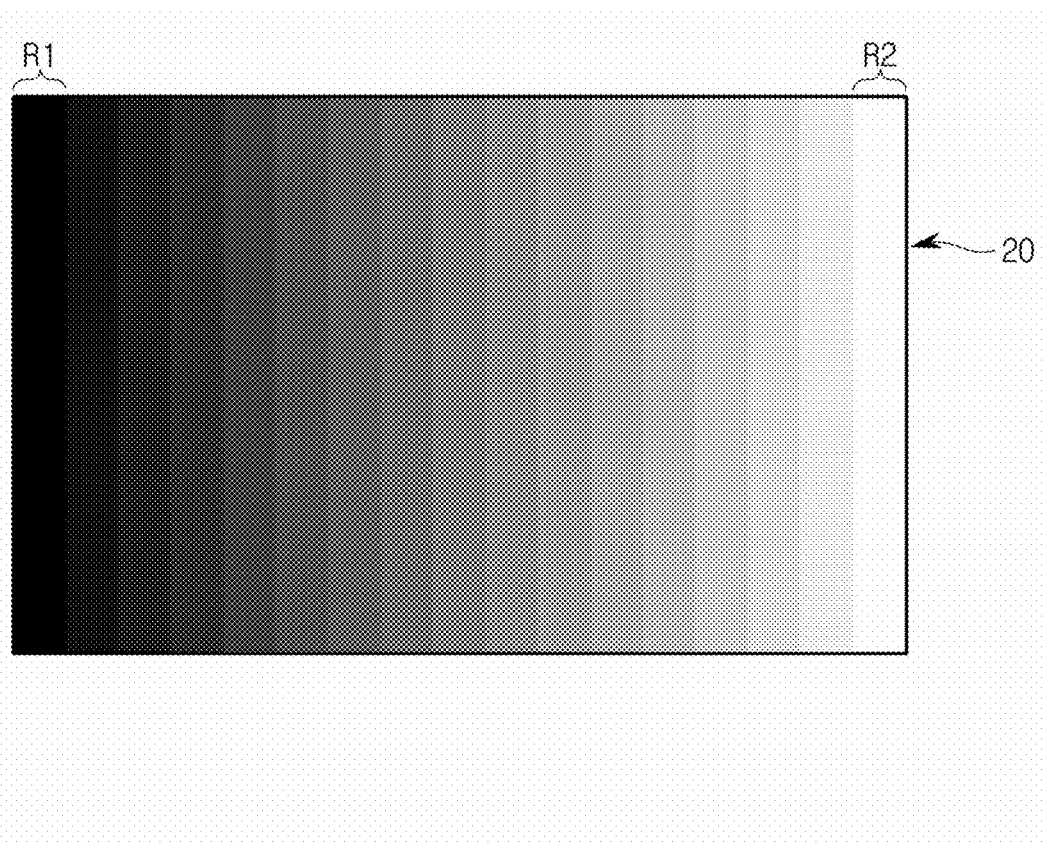
FIG. 4 is a diagram illustrating an example screen when image data is normally output according to an example embodiment of the present disclosure.
Figure 5:
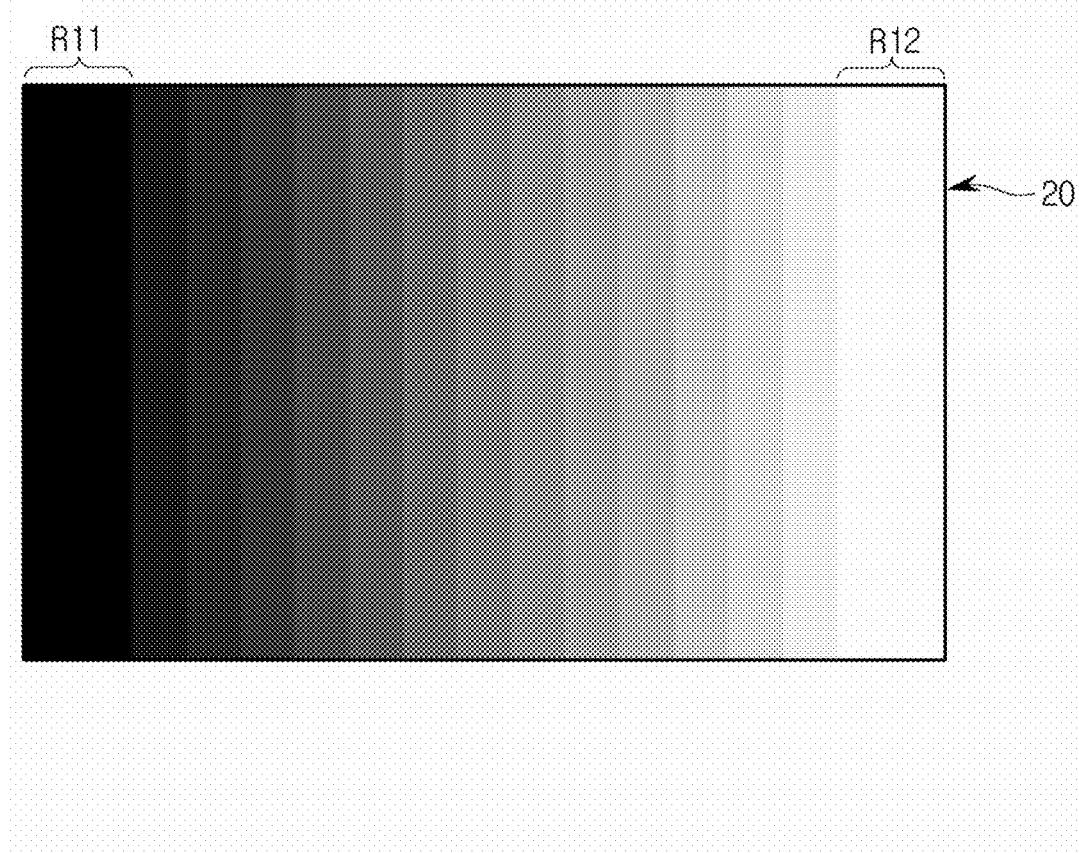
FIG. 5 is a diagram illustrating an example screen when image data is distorted and output.
Figure 6:
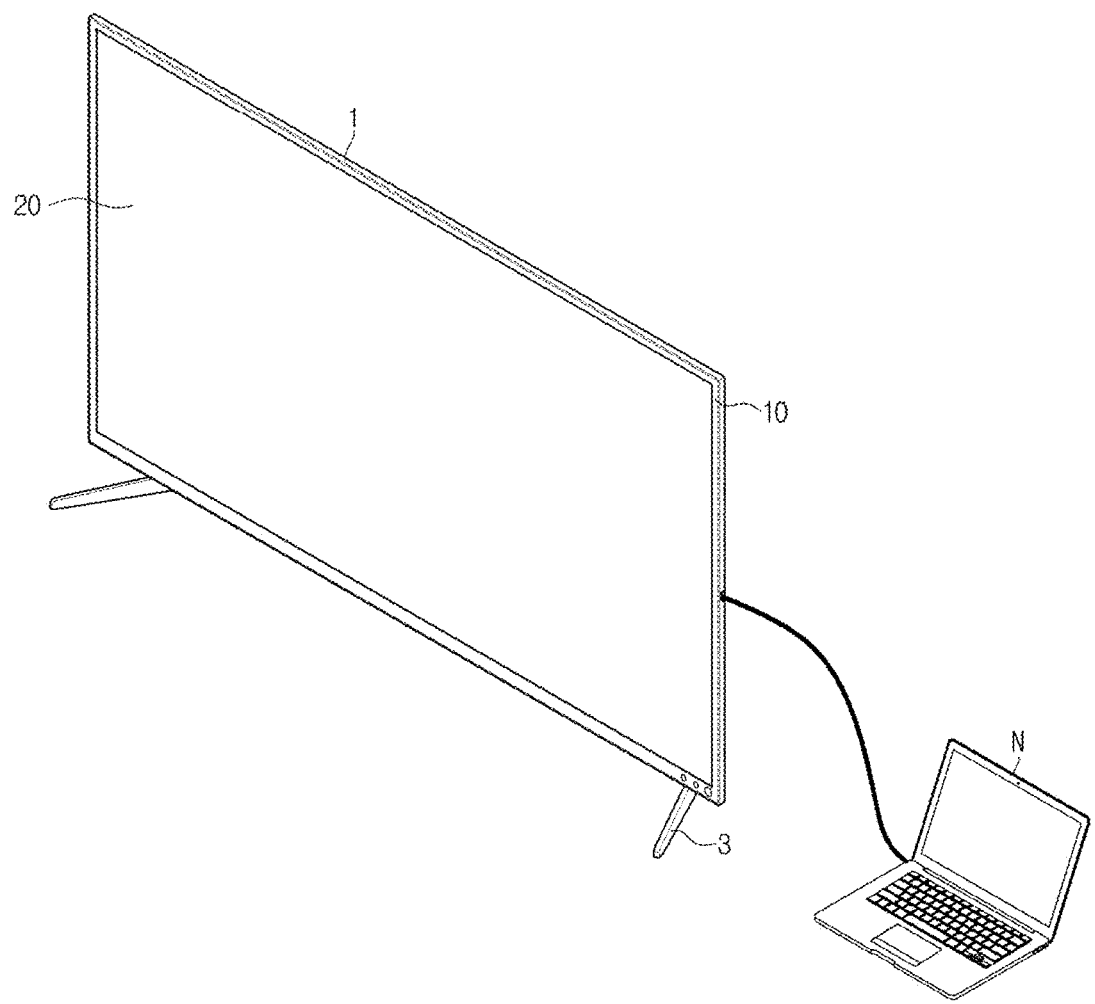
FIG. 6 is a diagram illustrating an example in which image data is displayed in cooperation with an external apparatus.
Figure 7A:
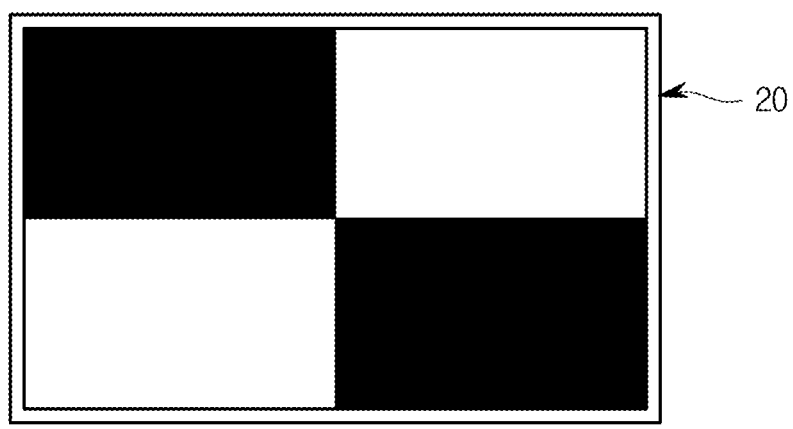
FIGS. 7A, 7B, and 7C are diagrams illustrating example image data including a white color level and a black color level in different patterns.
Figure 7B:
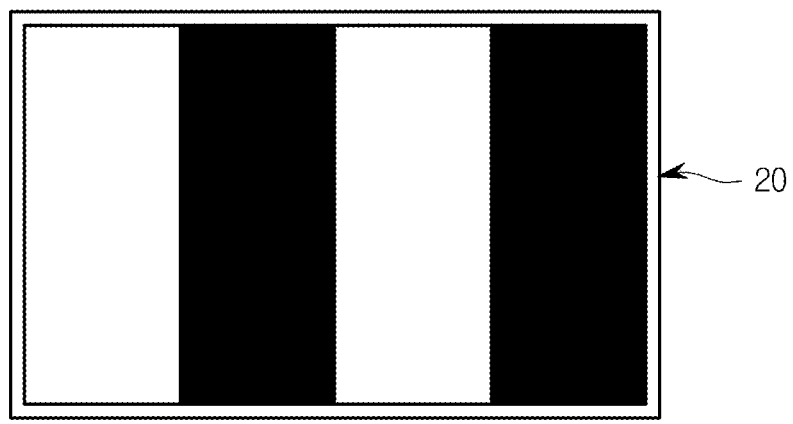
Figure 7C:
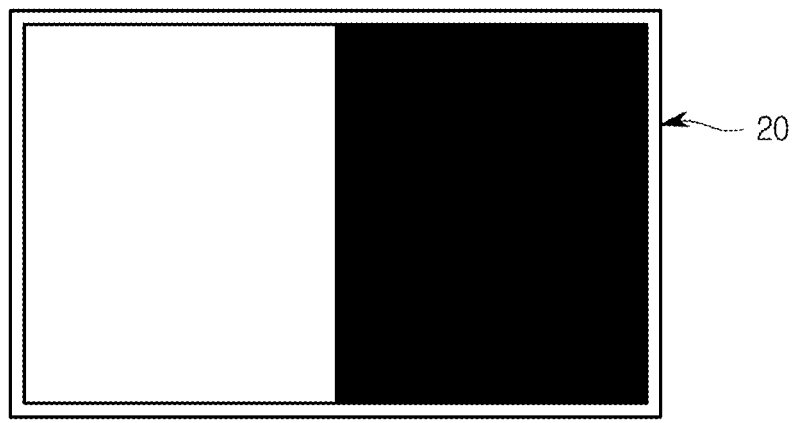

FIG. 3 is a block diagram illustrating an example display apparatus according to an example embodiment of the present disclosure. FIG. 4 is a diagram illustrating an example of a screen when image data is normally output according to an example embodiment. FIG. 5 illustrating an example of a screen when image data is distorted and output. FIG. 6 is a diagram illustrating an example in which image data is displayed in cooperation with an external apparatus. FIGS. 7A, 7B, and 7C are diagrams illustrating example image data including a white color level and a black color level in different patterns. FIG. 8 is a diagram illustrating an example histogram analysis result according to an example embodiment. Hereinafter, the description will be given together to avoid duplication of the description.

Referring to FIG. 3, the display apparatus 1 may include an input unit (e.g., including input circuitry) 110 configured to receive various control commands from the user, a content receiver (e.g., including receiver circuitry) 120 configured to receive content including images and sound from an external device, a sound output unit (e.g., including sound output circuitry) 130 configured to output sound corresponding to sound data included in the content, a communication unit (e.g., including communication circuitry) 140 configured to transmit and receive various kinds of data such as content through a communication network, an image processor (e.g., including processing circuitry) 150 configured to process image data included in the content, a display unit (e.g., including a display) 160 configured to display images corresponding to the image data included in the content, and a controller (e.g., including processing circuitry) 170 configured to control overall operations of the display apparatus 1.

At least one of the content receiver 120, the communication unit 140, and the controller 170 may be integrated into a System On Chip (SOC) installed in the display apparatus 1. However, the display apparatus 1 may include two SOCs or more. However, since there is not only one system-on-chip included in the display apparatus 1, it is not limited to being integrated into one system-on-chip.

The input unit 110 may include various input circuitry and receive various control commands from the user.

For example, the input unit 110 may include various input circuitry, such as, for example, and without limitation, a button group 111, as illustrated in FIG. 3. According to an example embodiment, the button group 111 may include a volume button to adjust the volume of sound to be output from the sound output unit 130, a channel button to change a communication channel that is received by the content receiver 120, and a power button to turn on/off the display apparatus 1. Also, the input unit 110 may receive various control commands for the display apparatus 1 from the user through the button group 111.

For example, the button group 111 may include a button for automatically setting the color level. Here, the setting of the color level may include a series of operations of changing the display mode or converting the color level range based on the color level range so that the image data is not distorted. In one embodiment, the color level setting may be referred to as a black color level setting, but may be referred to as a color level setting hereinafter for convenience of explanation.

Upon receiving a color level automatic setting command from the user through the above-described button, the controller 170 controls the image processor 150 to determine the color level range, and automatically sets the corresponding process based on the determination result. The display apparatus 1 according to the embodiment can prevent the image data from being distorted even if the user does not directly set the color level by supporting the automatic setting function of the color level. A detailed description thereof will be given later.

Meanwhile, various kinds of buttons included in the button group 111 may include a push switch and a membrane switch for sensing pressure applied by a user, or a touch switch for sensing a touch input by a user's body part. However, the buttons included in the button group 111 are not limited to the above-described switches or buttons, and the button group 111 may adopt various input means capable of outputting electrical signals in correspondence to a user's specific gestures.

Also, the input unit 110 may include a remote controller to receive a control command from a user remotely, and to transmit the control command to the display apparatus 1. The automatic setting button of the color level may be provided in the remote controller, but there is no limitation thereto.

Also, the input unit 110 may include various well-known components capable of receiving control commands from the user. Also, if the display panel 20 is implemented as a touch screen, the display panel 20 may function as the input unit 110.

For example, the input unit 110 may receive a control command for the display apparatus 1 from the user, through the button group 111, the remote controller, or the display panel 20 embodied as a touch screen. Then, the input unit 110 may transfer the received control command to the controller 170, and the controller 170 may control at least one of the components of the display apparatus 1 according to the control signal. The controller 170 will be described in more detail, later.

The display apparatus 1 may include the content receiver 120.

The content receiver 120 may include various circuitry and receive various kinds of content from various external devices. For example, and without limitation, the content receiver 120 may receive content from an antenna of receiving broadcasting signals in a wireless fashion, a set top box of receiving broadcasting signals in a wired or wireless fashion and converts the received broadcasting signals appropriately, and a multimedia reproducing apparatus (for example, a Digital Versatile Disk (DVD) player, a Compact Disk (CD) player, a Blu-ray player, etc.) of reproducing content stored in multimedia storage medium, etc.

For example, the content receiver 120 may include a plurality of connectors 121 connected to an external device, a reception path selector 123 which may include various circuitry to select a path for receiving content from among the plurality of connectors 121, and a tuner 125 to select a channel (or frequency) for receiving broadcasting signals.

The connectors 121 may include, for example, and without limitation, an RF coaxial cable connector to receive broadcasting signals including content from an antenna, a High Definition Multimedia Interface (HDMI) connector to receive content from a set top box or a multimedia reproducing apparatus, a component video connector, a composite video connector, a D-sub connector, or the like.

The reception path selector 123 may include various circuitry to select a connector for receiving content from among the plurality of connectors 121. For example, the reception path selector 123 may automatically select a connector by which content is received, or may select a connector for receiving content according to a user's control command.

If broadcasting signals are received, the tuner 125 may extract a transmission signal of a predetermined frequency (or channel) from among various signals received by an antenna, etc. In other words, the tuner 125 may select a channel (or a frequency) for receiving content according to a user's command of selecting the channel.

If image data of a channel selected by the tuner 125 is received, the image data may be transferred to the image processor 150. Then, the image processor 150 may perform image processing on the image data to display color data, an image control signal, etc. from the image data, and the display unit 160 may restore an image on the display panel 20 based on the color data, the image control signal, etc.

The image processing process to be described below may include, for example, and without limitation, a process of pre-processing or noise reduction of image data such as decoding or the like, contrast enhancement, detail enhancement, color processing and performing a series of image quality improvement processes such as the above. It is also possible to collectively refer to a step of converting the color format or converting the color level range to be displayed on the display panel 20, and the like.

Also, the display apparatus 1 may include the sound output unit 130.

The sound output unit 130 may include various circuitry to receive sound data from the content receiver 120 according to a control signal from the controller 170, and output sound. The sound output unit 130 may include one or more speakers 131 to convert electrical signals into sound signals.

Meanwhile, the display apparatus 1 may include the communication unit 140, as illustrated in FIG. 3. The communication unit 140 may include various communication circuitry, such as, for example, and without limitation, a wired communication module including wired communication circuitry 141 to support a wired communication method, and a wireless communication module including wireless communication circuitry 143 to support a wireless communication method and may support various communication methods.

The communication methods may include a wireless communication method and a wired communication method. The wired communication method may refer, for example, to a communication method for transmitting and receiving signals including data in a wireless fashion. The wireless communication method may include various communication methods, such as 3Generation (3G), 4Generation (4G), Wireless Local Area Network (WLAN), Wireless-Fidelity (Wi-Fi), Bluetooth, Zigbee, Wi-Fi Direct (WFD), Ultra Wideband (UWB), Infrared Data Association (IrDA), Bluetooth Low Energy (BLE), Near Field Communication (NFC), Z-Wave, or the like, although not limited to these.

Also, the wired communication method may refer, for example, to a communication method for transmitting and receiving signals including data in a wired fashion. For example, the wired communication method may include Peripheral Component Interconnect (PCI), PCI-express, Universe Serial Bus (USB), or the like, although not limited to these. For example, the controller 170 may control operations of the communication unit 140 through a control signal to download various kinds of content through a wired communication network or a wireless communication network, and provide the downloaded content to a user.

The wired communication module 141 and the wireless communication module 143 may be implemented as separate chips. However, the wired communication module 141 and the wireless communication module 143 may be integrated into a single chip.

The display apparatus 1 may include the display unit 160. Referring to FIG. 3, the display unit 160 may include the display driver 19, and the display panel 20.

The display driver 19 may drive the display panel 20 to receive image data from the image processor 150 and display an image corresponding to the received image data according to a control signal of the controller 170. A detailed description of the controller 170 will be given later.

Herein, the display panel 20 may be implemented as a Cathode Ray Tube (CRT) display panel, a Liquid Crystal Display (LCD) panel, a Light Emitting Diode (LED) panel, an Organic Light Emitting Diode (OLED) panel, a Plasma Display Panel (PDP), a Field Emission Display (FED) panel, or the like, although not limited to these.

For example, the display panel 20 may include a plurality of pixels. Herein, the pixel is the smallest unit of a screen displayed through the display panel 20, and also called a dot. In the following description, for convenience of description, the pixel and the dot may be collectively referred to as a "pixel."

Each pixel may receive an electrical signal representing image data, and output an optical signal corresponding to the received electrical signal. Optical signals output from the plurality of pixels included in the display panel 20 may be combined to display image data on the display panel 20. Therefore, by how much the optical signal is output can be set for each pixel, and the color level can also be set for each pixel. In other words, the image data may include data regarding the color level per pixel.

Meanwhile, the display apparatus 1 may include the image processor 150. The image processor 150 may include various image processing circuitry and/or program elements to perform image processing on image data among contents received from the content receiver 120 or the communication unit 140 or the like.

The image processor 150 may include a graphics processor 151 and a graphics memory 155, as illustrated in FIG. 3.

The graphics processor 151 and the graphics memory 155 may be implemented as separate chips. However, the graphics processor 151 and the graphics memory 155 are not limited to being implemented as separate chips. The graphics processor 151 and the graphics memory 155 may be integrated into a single chip, and there is no limitation.

The graphics memory 155 may store an image processing program for image processing and processed color data, or may temporarily store image information output from the graphics processor 151 or image information received from the content receiver 120.

In addition, the graphics memory 155 may store data related to an application program or algorithm for analyzing a histogram of image data and determining a color level range. In addition, the graphics memory 155 may store data relating to an application program or algorithm that performs a corresponding process based on a result of determination regarding a color level range. The above-described data can be stored in a memory 173, and there is no limitation on the method of storing the data.

For example, the graphics processor 151 may perform image processing on image data among content stored in the graphics memory 155 to acquire an image control signal, color data, etc.

The image data can be represented according to various methods. For example, colors can be represented according to a RGB (Red, Green, and Blue) method or a YUV (YCbCr) method of representing colors using brightness and color differences. The image processer 150 may suitably convert the color format of the image data according to the specification of the display apparatus.

The graphics processor 151 can distinguish the image data based on the YUV method and the image data based on the RGB method, and can appropriately perform the automatic conversion.

However, image data based on the RGB method can be represented by a plurality of color level ranges. For example, image data based on the RGB method can be represented by N (N≥1) bits for each pixel. In one embodiment, the image data based on the RGB method can be represented by a total of 256 color levels, 8 bits per pixel. There is no limitation such that the color level can represent the luminance level.

For example, a color format based on the RGB method can be represented by a color level or a first color level range in which a color level or a color level value is composed of a color level from 0 to 255. The color level indicating a black color, or the color level value corresponds to 0, and the color level indicating a white color, or the color level value may correspond to 255. Hereinafter, for convenience of description, the color level and the color level value may be referred to as a color level.

As another example, the color format based on the RGB method can be represented by a second color level range composed of 16 to 235 color levels. The color level representing a black color corresponds to 16, and the color level representing a white color may correspond to 235.

The first color level range is also referred to as a full color level range or a full range, but hereinafter may be referred to as a first color level range for convenience of explanation.

The second color level range is also referred to as a partial color level range or a limit range, but hereinafter, may be referred to as a second color level range for convenience of explanation.

FIG. 4 is a diagram illustrating an example screen when image data is normally output according to an example embodiment. FIG. 5 is a diagram illustrating an example screen when image data is distorted and output.

Referring to FIG. 4, the display panel 20 displays image data having the same widths of a black color region R1 and a white color region R2. For example, the image data displayed on the display panel 20 may be expressed according to the first color level range. If the display mode of the display apparatus 1 is set to display the image data according to the first color level range, the image data may be normally output as illustrated in FIG. 4.

However, if the display mode of the display apparatus 1 is set to display image data according to the second color level range, the image data may be distorted as illustrated in FIG. 5.

For example, when the image data is displayed according to the second color level range, the image processor 150 can recognize the image data having the color levels from 0 to 15 as a black color and the color levels from 236 to 255 as a white color.

Accordingly, a black color region R11 and a white color region R12 illustrated in FIG. 5 are displayed wider than the black color region R1 and the white color region R2 in FIG. 4, respectively, so that the image can be distorted. In order to prevent and/or reduce such image distortion, the user has to set the color level range directly.

However, the display apparatus 1 according to an example embodiment automatically determines the color level range of the image data without manually setting the user and changes the setting of the display apparatus 1 appropriately based on the determination result Therefore, it is possible to maintain the image quality of the display apparatus at a high level and to provide convenience to the user.

Hereinafter, a method of determining a color level range of image data and performing a suitable process based on the determination result will be described. A color format based on the RGB method will be described as an example, but the example embodiments to be described hereinafter are not limited thereto, and can be applied if different color formats or the same color format can be expressed in different color level ranges.

The graphics processor 151 can determine the color level range by analyzing the histogram of the input image data. For example, the graphics processor 151 can determine the color level range by analyzing the histogram of the image data stored in the graphics memory 155 using the image processing program stored in the graphics memory 155.

The histogram may refer, for example, to a color level distribution diagram of image data.

FIG. 8 is a diagram illustrating an example histogram analysis result according to an example embodiment.

In the histogram of FIG. 8, the x-axis represents the color level and the y-axis represents the number of image data.

The color level of the image data may be the same or different for each pixel. The graphics processor 151 can determine the color level range of the image data by analyzing the histogram of the input image data as illustrated in FIG. 8.

The graphics processor 151 analyzes the histogram of the input image data and can determine the color level range of the image data using at least one of the minimum color level and the maximum color level derived based on the analysis result.

For example, the graphics processor 151 can determine the color level range of the image data as the first color level range when the image data having the minimum color level of less than 16 among the image data in the histogram exists. That is, if there exists image data that is out of a second color level range CR2, the graphics processor 151 can determine the color level range of the image data as the first color level range. In other words, the graphics processor 151 can determine that the image data is implemented in the first color level range if image data having a minimum color level of less than 16 exists.

As another example, if the minimum color level is 16 or more, that is, if the image data exists only within the color level range CR2, the graphics processor 151 can determine the color level range of the image data as the second color level range. In other words, if there exists only image data having a color level of 16 or more, the graphics processor 151 can recognize that the image data is implemented in the second color level range.

The graphics processor 151 according to the embodiment may determine the color level range using the maximum color level value as well as the minimum color level value to more accurately determine the color level range.

For example, if the maximum color level from the histogram is equal to or greater than 236, the graphics processor 151 can determine the color level range of the image data as the first color level range. That is, the graphics processor 151 can determine the color level range of the image data as the first color level range when the image data is within a first color level range CR1 and out of the second color level range CR2. In other words, if there exists image data having a maximum color level of 236 or more, the graphics processor 151 can recognize that the image data is implemented in the first color level range.

As another example, if the maximum color level value is 235 or less, the graphics processor 151 can determine the color level range of the image data as the second color level range. That is, if the image data exists only in the second color level range CR2, the graphics processor 151 can determine the color level range of the image data as the second color level range. In other words, if there exists only image data having a maximum color level of 235 or less, the graphics processor 151 can recognize that the image data is implemented in the second color level range.

In other words, the graphics processor 151 can determine that the image data corresponds to the second color level range if the minimum color level of the image data is 16 or more and the maximum color level is 235 or less. Also, the graphics processor 151 can determine that the image data corresponds to the first color level range if the minimum color level of the image data is less than 16 and the maximum color level is 236 or more.

As such, the graphics processor 151 according to an example embodiment can determine the color level range using the minimum color level and the maximum color level, thereby increasing the accuracy of the color level range determination.

At this time, the graphics processor 151 can determine the color level range of the image data more accurately if at least one of the white color level and the black color level is included in the image data used for the histogram analysis. Accordingly, the display apparatus 1 according to an example embodiment can set the histogram analysis target.

The image data to be subjected to the histogram analysis may be input from various image sources and stored in the graphics memory 155 and the graphics processor 151 may perform the histogram analysis using the image data stored in the graphics memory 155.

The controller 170 can directly request the user to input image data to be subjected to the histogram analysis. That is, the controller 170 displays a user interface on the display panel 20 for providing a pop-up message for requesting input of image data including at least one of a white color and a black color. Then, the user can input the image data through the electronic device connected to the display apparatus 1. A detailed description of the controller 170 will be provided below.

For example, referring to FIG. 6, a screen on a portable laptop N may be mirrored on the display panel 20 via an HDMI connector. When the user displays image data including at least one of a white color and a black color on the screen of the portable laptop N, the graphics processor 151 can set the mirrored image data as the histogram analysis target.

The image data that can accurately determine the color level range through the histogram analysis suffices to include at least one of a white color level and a black color level, and is not limited to a specific pattern.

For example, as illustrated in FIG. 7A, the image data to be subjected to the histogram analysis may include either a white color or a black color in each of the four squares. As another example, as illustrated in FIG. 7B, the histogram analysis can be performed on the image data including the white color and the black color intersected twice in the form of a bar. Also, as illustrated in FIG. 7C, it is possible to determine the range of the color level through the histogram analysis even if the image data including the white color and the black color intersect once in the form of a bar, and there is no limitation.

The image data to be subjected to the histogram analysis is not limited to the image data directly input by the user.

For example, the graphics processor 151 can automatically set image data input for a preset time, image data of a predetermined capacity, or image data included in a predetermined number of scenes as a histogram analysis target. Accordingly, the graphics processor 151 can accurately determine the color level range without requesting the user to input image data.

The preset time means a time at which at least one of a white color and a black color can be predicted to be included in the input image data for a specific time. In other words, it means that the time required for at least one of the white color and the black color to be included is sufficient and an excessive calculation is not required in the histogram analysis. Accordingly, the graphics processor 151 can set the input image data for the histogram analysis target for a preset time.

The preset capacity may refer, for example, to a capacity that is predicted to include at least one of white color video data and black color video data in the video data. In other words, it means a capacity which is sufficient to include at least one of a white color and a black color, but does not require an excessive calculation in the histogram analysis. The graphics processor 151 can set the image data of the preset capacity as the histogram analysis target.

The predetermined number of scenes may refer, for example, to the number of scenes in which at least one of white color image data and black color image data is expected to be included in the image data. In other words, the predetermined number of scenes may refer, for example, to the number of scenes that are sufficient enough to include at least one of the white color and the black color, and do not require an excessive calculation in the histogram analysis. The graphics processor 151 can set the image data included in the predetermined number of scenes as the histogram analysis target. The graphics processor 151 can automatically provide convenience to the user by automatically setting the histogram analysis target, and at the same time can prevent performance degradation due to excessive computation.

The time, capacity, or number of scenes for the histogram analysis target setting may be preset and stored in the graphics memory 155 or in the memory 173. When stored in the memory 173, a processor 171 controls the image processor 150 to set the histogram analyzing object. On the other hand, the above-described time, capacity, number of times, and the like may be changed by a user, and there is no limitation.

The graphics processor 151 can perform the corresponding process based on the determination result. The present invention is not limited to the case where the graphics processor 151 performs the corresponding process and may be performed by the controller 170 or may be performed by the graphics processor 151 and the controller 170 together with no restriction.

For example, the graphics processor 151 can set the display mode to correspond to the color level range. The display mode may include a first display mode in which an image is displayed according to a first color level range and a second display mode in which an image is displayed in accordance with a second color level range.

The graphics processor 151 can change or maintain the display mode according to the preset display mode.

For example, if it is determined that the image data of the second color level range is inputted in the state that the first display mode is set, the graphics processor 151 may change the display mode from the first display mode to the second display mode. As another example, when the graphics processor 151 is set to the first display mode and it is determined that the image data of the first color level range is inputted, the graphics processor can control the first display mode to be maintained.

As another example, when it is determined that the image data of the first color level range is inputted in the state where the second display mode is set, the graphics processor 151 may change the display mode from the second display mode to the first display mode. As another example, when it is determined that the image data of the second color level range is inputted in the state where the second display mode is set, the graphics processor 151 can control the display mode to maintain the second display mode. The operation related to the change or maintenance of the display mode may be performed by the controller 170 or through the interlocking between the graphics processor 151 and the controller 170.

The graphics processor 151 can not only set the display mode based on the determination result, but can also convert the color level range.

For example, the graphics processor 151 may convert the color level range of the image data according to the set display mode. In an example embodiment, when it is determined that the image data of the second color level range is input in a state where the first display mode is set, the graphics processor 151 sets the color level range of the image data in the second color level range to the first color level range and outputs it. Accordingly, clearer image data can be displayed on the display panel 20.

In addition, when it is determined that the image data of the first color level range is inputted in the state where the second display mode is set, the graphics processor 151 sets the color level range of the image data in the first color level range to the second color level range and outputs it. Hereinafter, the controller 170 will be described.

Meanwhile, the display apparatus 1 may include the controller 170. The controller 170 may include various processing circuitry including, for example, and without limitation, the processor 171 and the memory 173, as illustrated in FIG. 3.

The memory 173 may store a control program and control data for controlling operations of the display apparatus 1, and temporarily store a control command received through the input unit 110 or a control signal output from the processor 171.

The memory 173 may store a control program and control data related to the determination of the color level range as described above.

For example, the memory 173 may store data related to an application program or algorithm for analyzing the histogram of the image data and determining the color level range. In addition, the memory 173 may store data related to an application program, an algorithm, and the like that perform a corresponding process based on the determination result regarding the color level range.

Further, the memory 173 may store data relating to the user interface.

The user interface means an environment in which a user inputs various setting commands, control commands, and the like related to the display apparatus 1, controls a program stored in the memory 173, and easily grasps various information.

For example, the user interface may be a graphical user interface that graphically implements a screen displayed on the display panel 20 so that various information and commands exchanging operations between the user and the display apparatus 1 may be more conveniently performed.

A method of providing various information through a user interface, a method of displaying and arranging an icon to receive various commands from a user, and the like can be implemented by an algorithm or a program and stored in the memory 173. Accordingly, the processor 171 can display the user interface on the display panel 20 using the data stored in the memory 173.

On the other hand, the data stored in at least one of the graphics memory 155 and the memory 173 may be updated. For example, the data related to the user interface stored in at least one of the graphics memory 155 and the memory 173, the data relating to the histogram analysis method, and the method of performing the process corresponding to the determination result is transmitted to the communication unit 140 with no limit to the method.

The data stored in at least one of the graphics memory 155 and the memory 173 may be updated according to a control instruction of the user or may be automatically updated according to a predetermined cycle.

The processor 171 may include various processing circuitry and control overall operations of the display apparatus 1. The processor 171 can generate a control signal for controlling the components of the display apparatus 1 based on the control program stored in the memory 173, and can control the operation of each component.

For example, the processor 171 may control the communication unit 140 based on a control signal to transmit or receive signals including data to or from an external device. According to another embodiment, the processor 171 may transfer a control signal to the sound output unit 130 according to a volume control command received through the input unit 110 to adjust the volume of sound that is output through the speakers 131.

According to another example, the processor 171 may control the image processor 150 to perform image processing on content received from the content receiver 120, and control the display unit 160 to display the image-processed image.

As another example, the processor 171 may control the operation of the components of the display apparatus 1 in accordance with a user's control command. For example, when the user inputs a color level automatic setting through a button included in the remote controller or the button group 111, the processor 171 controls the image processor 150 to determine the range of the color level. Further, the processor 171 controls the image processor 150 to change the display mode or the color level range based on the determination result.

On the other hand, the processor 171 does not control the image processor 150 to perform the above-described operation until the automatic level setting command is received. For example, when the power of the display apparatus 1 is connected, the input of image data based on the RGB system is detected, or the connection with the external image source is detected through the connector or the communication unit 140, and the processor 171 may control the image processor 150 to perform the above-described operations.

The processor 171 may display on the display panel 20 a user interface for receiving the time, capacity, or number of scenes for setting the histogram analysis target data from the user. Accordingly, the user can change the above-described information through the remote controller or the button group 111 while viewing the user interface displayed on the display panel 20.

The processor 171 may display on the display panel 20 a user interface that provides a pop-up message requesting input of an image including a white color and a black color. Accordingly, when the user displays image data including the white color and the black color on the electronic device mirrored with the display apparatus 1, the processor 171 controls the image processor 150 to perform a histogram analysis.

The processor 171 and the memory 173 have been described as separate devices, however, the processor 171 and the memory 173 may be integrated into a single chip.

Meanwhile, some or all of the components of the image processor 150 may be included in the controller 170. For example, the controller 170 may perform the operations of the image processor 150 described above or may partially perform the operations. The operation of the above-described operations is changed from the image processor 150 to the controller 170, and the operations are the same or substantially similar, and a detailed description thereof will not be repeated. Hereinafter, the operation flow of the display apparatus will be described.

Figure 9:
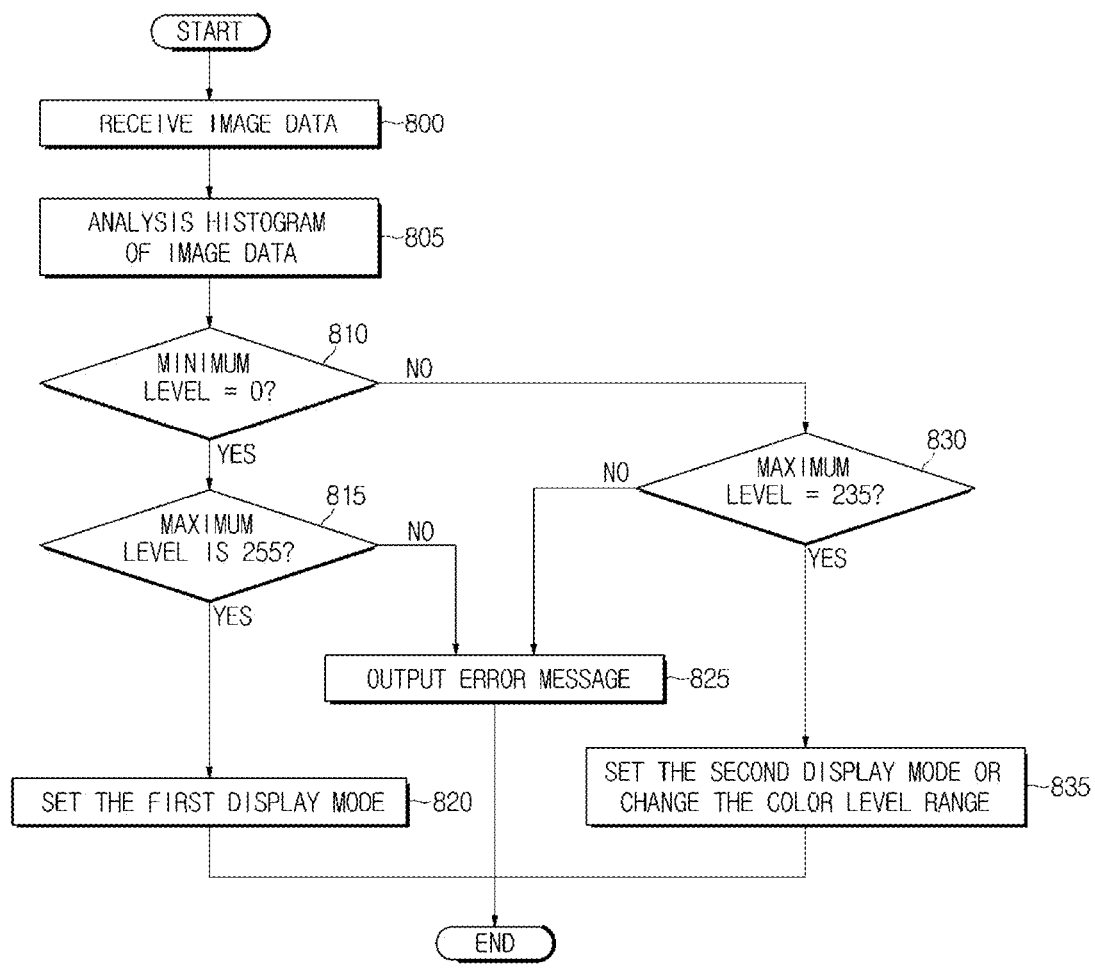
FIG. 9 is a flowchart illustrating an example process corresponding to a histogram analysis result of input image data according to an example embodiment of the present disclosure.
Figure 10:
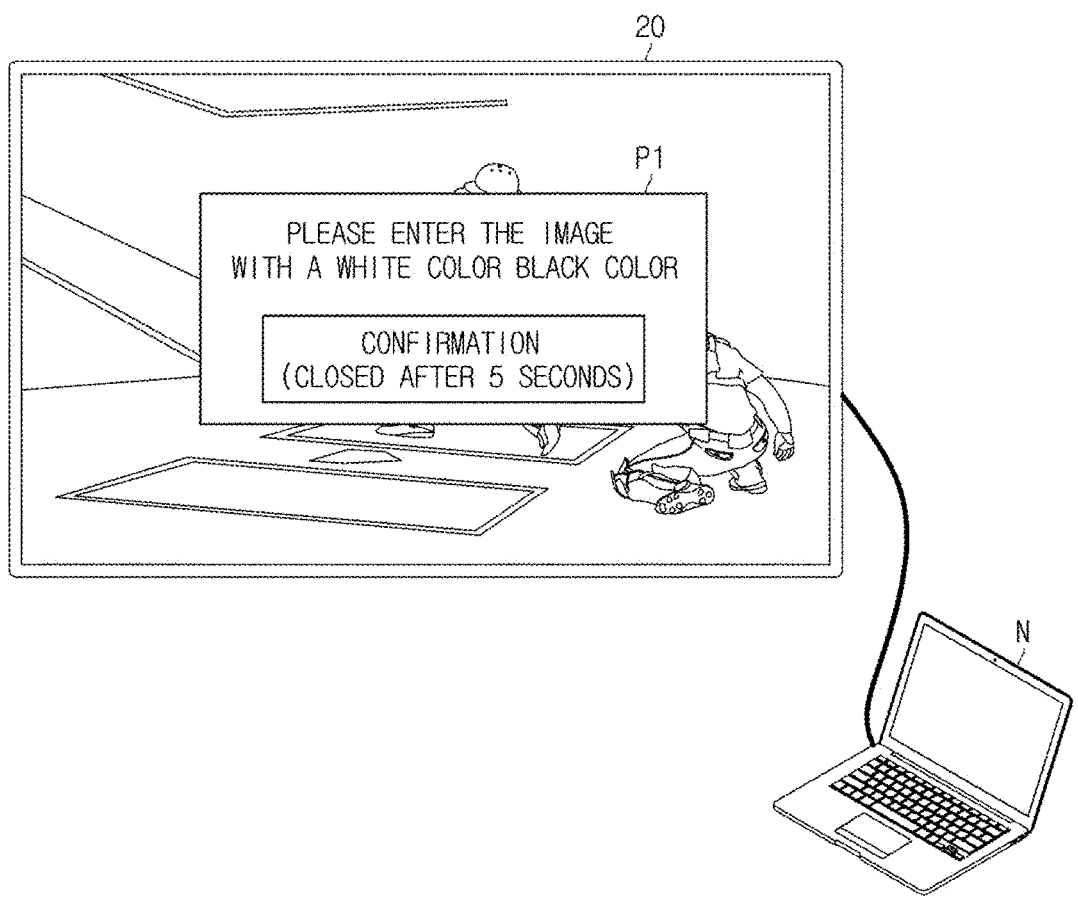
FIG. 10 is a diagram illustrating an example pop-up message requesting input of image data to a display panel according to an example embodiment of the present disclosure.
Figure 11A:
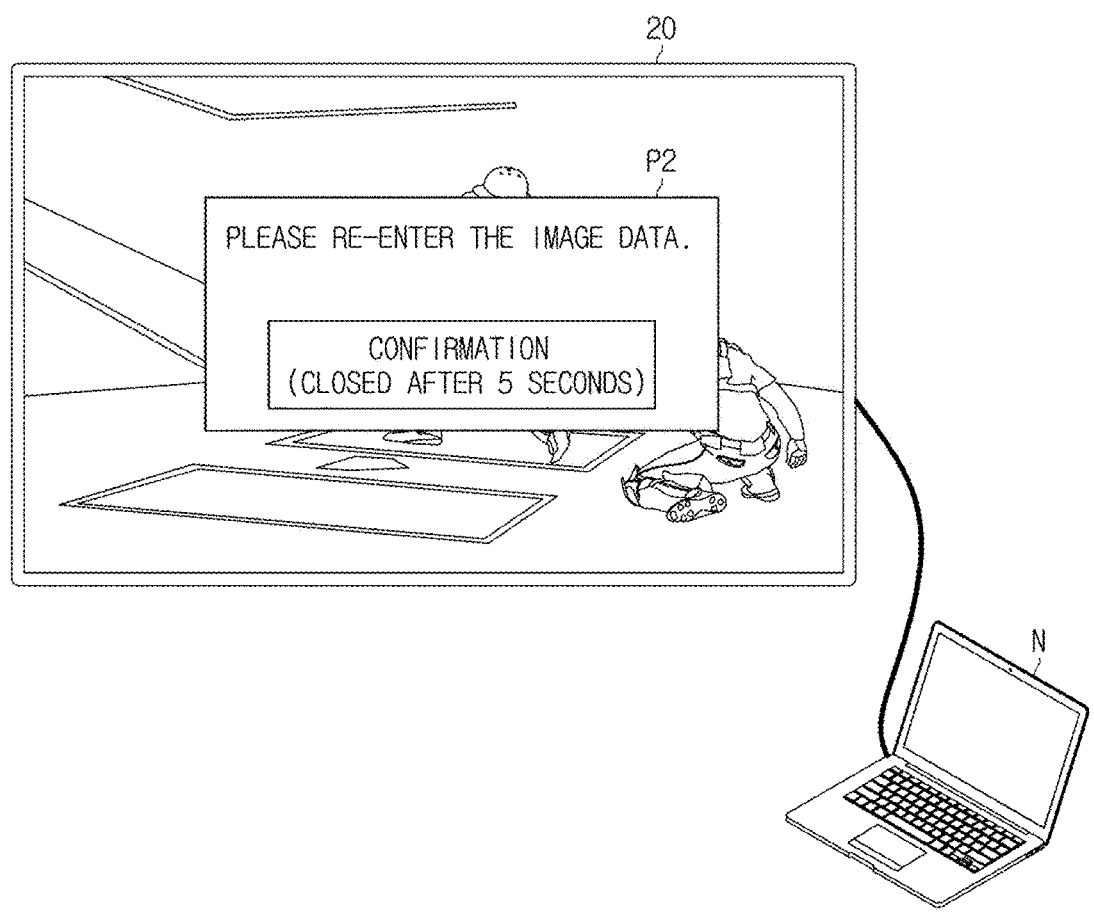
FIG. 11A is a diagram illustrating an example pop-up message requesting re-input of image data to a display panel according to an example embodiment of the present disclosure.
Figure 11B:
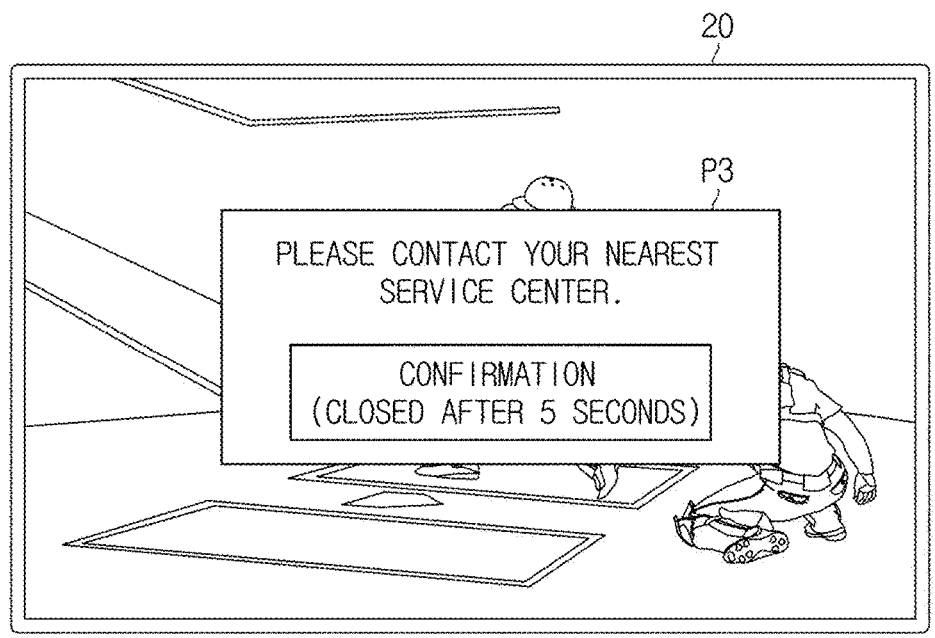
FIG. 11B is a diagram illustrating an example pop-up message including a warning content displayed on a display panel according to an example embodiment of the present disclosure.

FIG. 9 is a flowchart illustrating an example process corresponding to a histogram analysis result of input image data according to an example embodiment of the present disclosure. FIG. 10 is a diagram illustrating an example pop-up message requesting input of image data to a display panel according to an example embodiment of the present disclosure. FIG. 11A is a diagram illustrating an example pop-up message requesting re-input of image data to a display panel according to an example embodiment of the present disclosure. FIG. 11B is a diagram illustrating an example pop-up message including a warning content displayed on a display panel according to an example embodiment of the present disclosure. Hereinafter, the description will be made in order to avoid duplication of the description.

Referring to FIG. 9, the display apparatus 1 can receive image data (800) and analyze the histogram of the received image data (805).

The image data to be subjected to the histogram analysis may be set through the user's input or automatically set. When it is automatically set, by how much the histogram analysis is to be performed on the image data can be set in advance.

For example, the display apparatus 1 may request input to the user by displaying on the display panel 20 a pop-up message P1 requesting input of an image including a white color and a black color as illustrated FIG. 10.

When the screen of the portable laptop N is mirrored to the display panel 20, the user can input image data including a white color and a black color through the portable laptop N, thereby inputting the image data.

As another example, the display apparatus 1 may set the image data included in the present time, the preset capacity, and the number of preset scenes as the histogram analysis target, as described above.

The display apparatus 1 may determine the color level range using at least one of the minimum color level and the maximum color level of the image data based on the analysis result.

For example, the display apparatus 1 may determine whether the minimum color level from the histogram is zero (810).

If it is determined that the minimum color level is 0, the display apparatus 1 may directly determine that the first color level range is satisfied. However, it may be determined that the maximum color level of the color level is 255 for a more accurate determination (815).

If it is determined that the maximum color level is 255, the display apparatus 1 determines that the image data is implemented in the first color level range, and controls the image processing to be performed in the first display mode (820). For example, when the second display mode is set, the display apparatus 1 may change the display mode from the second display mode to the first display mode. As another example, when the first display mode is set, the display apparatus may maintain the display mode in the first display mode.

At this time, the display apparatus 1 is not only capable of changing or maintaining the display mode, but may also convert the image data from the first color level range to the second color level range.

However, if the minimum color level in the image data is 0 and the maximum color level is not 255, the display apparatus 1 may determine that the color level range is not correctly determined and output an error message (825). That is, when the color level range cannot be accurately determined, the display apparatus 1 may output an error message to inform the user, rather than setting the display mode or converting the color level range.

For example, the display apparatus 1 may display a user interface configured to provide a pop-up message on the display panel 20.

At this time, the pop-up message may include various contents. For example, the display apparatus 1 may display a pop-up message P2 on the display panel 20 requesting re-input of image data, as illustrated in FIG. 11A. Then, the user inputs the image data including the white color and the black color to the portable terminal N mirrored with the display apparatus 1, so that the image data can be re-input.

As another example, the display apparatus 1 may display a pop-up message P3 on the display panel 20 asking the nearest service center to inquire, as illustrated in FIG. 11B. In addition, the pop-up message may include a request to visit a nearby service center.

In addition, the display apparatus 1 may output a warning notification through the sound output unit 130 or may output a warning message by outputting the contents of the pop-up message with no limit to the method.

On the other hand, if the minimum color level is not 0, the display apparatus 1 may determine (830) whether the maximum color level is 235 from the histogram. If the maximum color level is not 235, the display apparatus 1 may determine that the determination of the color level range is not normally performed, and may output an error message (835) rather than setting the display mode or converting the color level range. A detailed description thereof has been described above, and a detailed description thereof will be omitted.

If it is determined that the maximum color level is 235, the display apparatus 1 can set the second display mode or convert the color level range (835).

For example, when the first display mode is set, the display apparatus 1 may change the display mode from the first display mode to the second display mode. As another example, when the second display mode is set, the display apparatus may maintain the display mode in the second display mode.

In addition, the display apparatus 1 may convert the color level range through an image processing process. For example, the display apparatus 1 may convert the image data implemented in the second color level range to the first color level range, thereby providing higher resolution image data.

A method of changing the display mode and a method of converting the color level range can be implemented in an algorithm and an application program form and stored in at least one of the memory 173 (FIG. 3) and the graphics memory 155 (FIG. 3). At this time, whether to change the display mode or the color level range can be changed depending on the setting of the user. Hereinafter, the operation of the display apparatus 1 will be briefly described.

Figure 12:
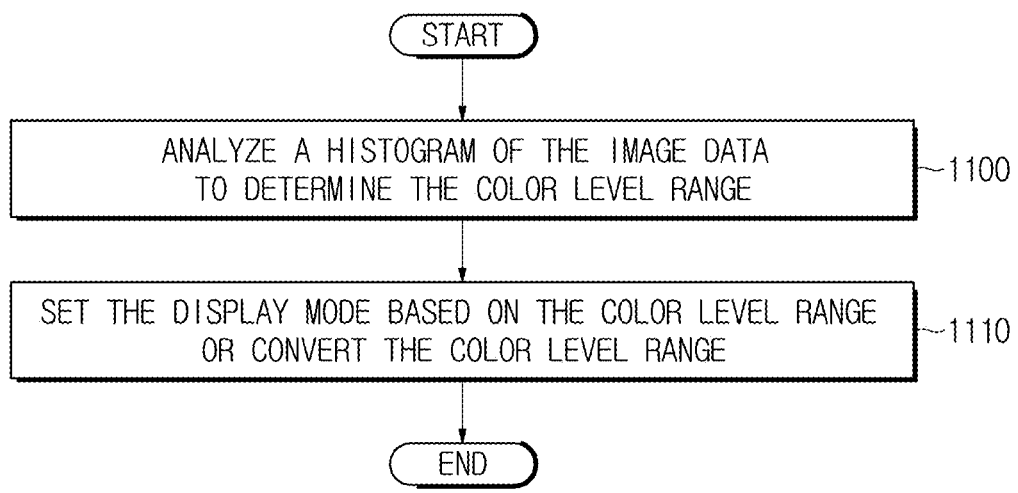
FIG. 12 is a flowchart illustrating example operation flow of a display apparatus according to an example embodiment of the present disclosure.

FIG. 12 is a flowchart illustrating an example operation flow of a display apparatus according to an example embodiment of the present disclosure.

Referring to FIG. 12, the display apparatus 1 may analyze the histogram of the image data to determine a color level range (1100).

The histogram is a distribution chart about the color level of the image data. The display apparatus has a built-in histogram analysis function, which enables a histogram analysis of the input image data.

The display apparatus 1 may analyze the color level of the image data based on the histogram to determine at least one of the minimum color level and the maximum color level of the image data. The display apparatus 1 may determine whether the color level range of the image data corresponds to the first color level range or the second color level range based on at least one of the determined minimum color level and the maximum color level.

For example, if the minimum color level determined through the histogram analysis is lower than the minimum color level in the second color level range and higher than the maximum color level in the second color level range, the display apparatus 1 sets the color level range of the image data to the first color level range.

As another example, if the minimum color level determined through the histogram analysis is at least the minimum color level within the second color level range and below the maximum color level within the second color level range, the display apparatus 1 may set the color level range of the image data to the second color level range.

The display apparatus 1 may set the display mode or perform the conversion of the color level range based on the determined color level range (1110).

For example, the display apparatus 1 may change or maintain the display mode so that it corresponds to the color level range determined by the image data. As another example, the display apparatus may convert the color level range of the image data to correspond to the set display mode. A detailed description thereof is omitted herein.

On the other hand, if the color level range cannot be determined based on the minimum color level and the maximum color level, for example, if the minimum color level is within the second color level range, but the maximum color level is outside the second color level range, the display apparatus 1 may request re-input of the image data or display a pop-up message including the warning contents.

The display apparatus 1 may request re-input of the image data to induce a re-determination of the color level range or to prompt the user to check for failure of the device.

The display apparatus 1 according to an example embodiment can automatically provide convenience to the user by automatically determining the color level range of the image data without any special setting. Further, the display apparatus 1 according to the embodiment can prevent the distortion of the video data by setting the display mode so as to correspond to the determination result or changing the color level range of the video data.

Configurations illustrated in the various example embodiments and the drawings described in the present disclosure are merely example embodiments of the present disclosure, and thus it is to be understood that various modified examples, which may replace the embodiments and the drawings described in the present disclosure, are possible.

The terms used in the present disclosure are used to describe various example embodiments of the present disclosure. Accordingly, it should be apparent to those skilled in the art that the following description of example embodiments of the present disclosure is provided for illustration purpose only and not for the purpose of limiting the disclosure as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this disclosure, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

As used herein, the terms "unit," "device," "block," "member," or "module" refer to a unit that can perform at least one function or operation, and may be implemented as a software or hardware component or a combination thereof such as, for example, and without limitation, a dedicated processor, a CPU, a Field Programmable Gate Array (FPGA) or an Application Specific Integrated Circuit (ASIC). However, the terms "unit," "device," "block," "member," or "module" is not limited to software or hardware. The "unit," "device," "block," "member," or "module" may be stored in an accessible storage medium, or may be configured to run on at least one processor.

Although various example embodiments of the present disclosure have been illustrated and described, it will be appreciated by those skilled in the art that changes may be made in these example embodiments without departing from the principles and spirit of the disclosure, the scope of which is defined in the appended claims and their equivalents.

What is claimed is:

1. A display apparatus comprising:
   an image processor configured to analyze a histogram of image data including at least one of: a white color level and a black color level to determine a color level range; and a controller configured to set a display mode or to convert the color level range based on the determined color level range, wherein the image processor is configured to:
  determine at least one of: a minimum color level and a maximum color level of the image data, based on the histogram of the image data,
  determine the color level range of the image data as a first color level range having a full color level when the image data has the minimum color level of less than a pre-determined minimum value or has the maximum color level of equal to or greater than a pre-determined maximum value, and
  determine the color level range of the image data as a second color level range having a partial color level when the image data has the minimum color level of equal to or greater than the pre-determined minimum value, or has the maximum color level of less than the pre-determined maximum value,
  wherein the second color level range is included in the first color level range and is narrower than the first color level range.

2. The display apparatus according to claim 1, wherein the controller is configured to set the display mode to either a first display mode in which the image data is displayed in a full color level range or a second display mode in which the image data is displayed in a partial color level range to correspond to the determined color level range.

3. The display apparatus according to claim 1, wherein the controller is configured to, if the determined color level range is a first color level range having a full color level and the display mode is set to a second display mode for displaying the image data in a partial color level range, change the display mode to a first display mode for displaying the image data in a full color level range.

4. The display apparatus according to claim 1, wherein the controller is configured to, if the determined color level range is a second color level range having a partial color level range and the display mode is set to a second display mode for displaying the image data in a partial color level range, change the display mode to a first display mode for displaying image data in a full color level range from the second display mode and to control the display mode to convert the color level range of the image data into the full color level range, or to maintain the set second display mode.

5. The display apparatus according to claim 1, wherein the controller is configured to display a user interface providing a pop-up message requesting input of image data including the at least one of the white color level and the black color level on a display panel.

6. The display apparatus according to claim 1, wherein the controller is configured to display a user interface providing a pop-up message requesting re-input of image data or including an alert notification content on a display panel if the color level range is not determined based on the determined at least one of: the minimum color level and the maximum color level.

7. A display apparatus comprising:
  an image processor configured to analyze at least one histogram of image data included in a preset time, image data included in a preset number of scenes, and image data included in a preset capacity to determine a color level range; and
  a controller configured to set a display mode or to convert the color level range based on the determined color level range, wherein the image processor is configured to:
  determine at least one of a minimum color level and a maximum color level of the image data, based on the histogram of the image data,
  determine the color level range of the image data as a first color level range having a full color level when the image data has the minimum color level of less than a pre-determined minimum value or has the maximum color level of equal to or greater than a pre-determined maximum value, and
  determine the color level range of the image data as a second color level range having a partial color level when the image data has the minimum color level of equal to or greater than the pre-determined minimum value, or has the maximum color level of less than the pre-determined maximum value,
  wherein the second color level range is at least partially included in the first color level range and is narrower than the first color level range.

8. The display apparatus according to claim 7, wherein the image processor is configured to set at least one of: the image data included in the preset time, the image data included in the predetermined number of scenes, and the image data included in the preset capacity as the histogram analysis target.

9. The display apparatus according to claim 7, wherein the controller is configured to set the display mode to a first display mode in which the display mode is displayed in a full color level range or a second display mode in which the display mode is displayed in a partial color level range to correspond to the determined color level range.

10. The display apparatus according to claim 7, wherein the controller is configured to, if the determined color level range is a first color level range having a full color level and the display mode is set to a second display mode for displaying the image data in a partial color level range, change the display mode to a first display mode for displaying the image data in a full color level range from the second display mode.

11. The display apparatus according to claim 7, wherein the controller is configured to change, if the determined color level range is a second color level range having a partial color level range and the display mode is set to a second display mode for displaying the image data in a partial color level range, change the display mode to a first display mode for displaying image data in a full color level range from the second display mode and to control the display mode to convert the color level range of the image data into the full color level range, or to maintain the set second display mode.

12. The display apparatus according to claim 8, wherein the controller is configured to display a user interface for providing a pop-up message including an alert notification content on a display panel if the color level range is not determined based on the determined at least one of the minimum color level and the maximum color level.

13. A method of driving a display apparatus, comprising:
  analyzing a histogram of the image data to determine a color level range;
  setting a display mode or controlling conversion of the color level range based on the determined color level range;
  determining at least one of a minimum color level and a maximum color level of the image data, based on the histogram of the image data;
  determining the color level range of the image data as a first color level range having a full color level when the image data has the minimum color level of less than a pre-determined minimum value or has the maximum color level of equal to or greater than a pre-determined maximum value; and determining the color level range of the image data as a second color level range having a partial color level when the image data has the minimum color level of equal to or greater than the pre-determined minimum value, or has the maximum color level of less than the pre-determined maximum value, wherein the second color level range is included in the first color level range and is narrower than the first color level range.

14. The method according to claim 13, wherein the determining of a color level range comprises setting at least one of: image data input from a user, image data included in a preset time, image data included in a predetermined number of scenes, and image data included in a preset capacity as a histogram analysis target.

15. The method according to claim 13, wherein the controlling of a color level range comprises setting the display mode to either a first display mode in which the image data is displayed in a full color level range or a second display mode in which the image data is displayed in a partial color level range to correspond to the determined color level range.

16. The method according to claim 13, wherein the controlling of a color level range comprises changing the display mode to a first display mode for displaying the image data in a full color level range if the determined color level range is a first color level range having a full color level and the display mode is set to a second display mode for displaying the image data in a partial color level range.

17. The method according to claim 13, wherein the controlling of a color level range comprises displaying a user interface for providing a pop-up message requesting re-input of image data or including an alert notification content on a display panel if the color level range is not determined based on the determined at least one of the minimum color level and the maximum color level.

* * * * *